United States Patent [19]

Johnson et al.

[11] Patent Number: 4,824,307
[45] Date of Patent: Apr. 25, 1989

[54] APPARATUS FOR VERTICALLY STACKING BATTERY PLATES

[75] Inventors: Peter E. Johnson; David A. Johnson, both of Corvallis, Oreg.

[73] Assignee: Tekmax Inc., Tangent, Oreg.

[21] Appl. No.: 154,757

[22] Filed: Feb. 11, 1988

[51] Int. Cl.[4] .............................................. B65H 31/38
[52] U.S. Cl. .................................... 44/798.2; 198/456; 414/788; 414/790.4
[58] Field of Search ...................... 414/28, 36, 47, 103, 414/786; 198/425, 456, 627; 271/221, 222

[56] References Cited

U.S. PATENT DOCUMENTS

| | | | |
|---|---|---|---|
| 1,586,544 | 6/1926 | White | 198/425 |
| 1,676,911 | 7/1928 | McDavitt | 198/425 X |
| 2,341,021 | 2/1944 | Curtis | 271/221 X |
| 2,761,361 | 9/1956 | Hornberger et al. | 414/47 |
| 2,805,757 | 9/1957 | Rapley | 414/28 X |
| 3,019,886 | 2/1962 | Winkler et al. | 198/425 |
| 4,346,882 | 8/1982 | Pessina et al. | 414/36 X |
| 4,645,400 | 2/1987 | Mally et al. | 414/28 |
| 4,744,201 | 5/1988 | Total et al. | 414/28 X |

FOREIGN PATENT DOCUMENTS 2092982  8/1982  United Kingdom ................ 198/627

Primary Examiner—Leslie J. Paperner
Attorney, Agent, or Firm—Chernoff, Vilhauer, McClung & Stenzel

[57] ABSTRACT

A method and apparatus for automated handling of battery plate stacks is disclosed. The apparatus includes an endless drive unit having a plurality of upstanding pockets which open to receive the plates and to assemble a predetermined number of them side by side in a vertically arranged stack. The drive unit includes a single revolution clutch which permits the drive unit to move a predetermined amount and then stop each time it is signaled by a controller that the proper number of plates has been inserted into a particular pocket. Thus, movement of the drive unit is interrupted while the plates are being inserted into the pockets and commences again when the pockets are loaded. The stacks of plates then are blocked and centered as they move through the apparatus in their pockets.

6 Claims, 2 Drawing Sheets

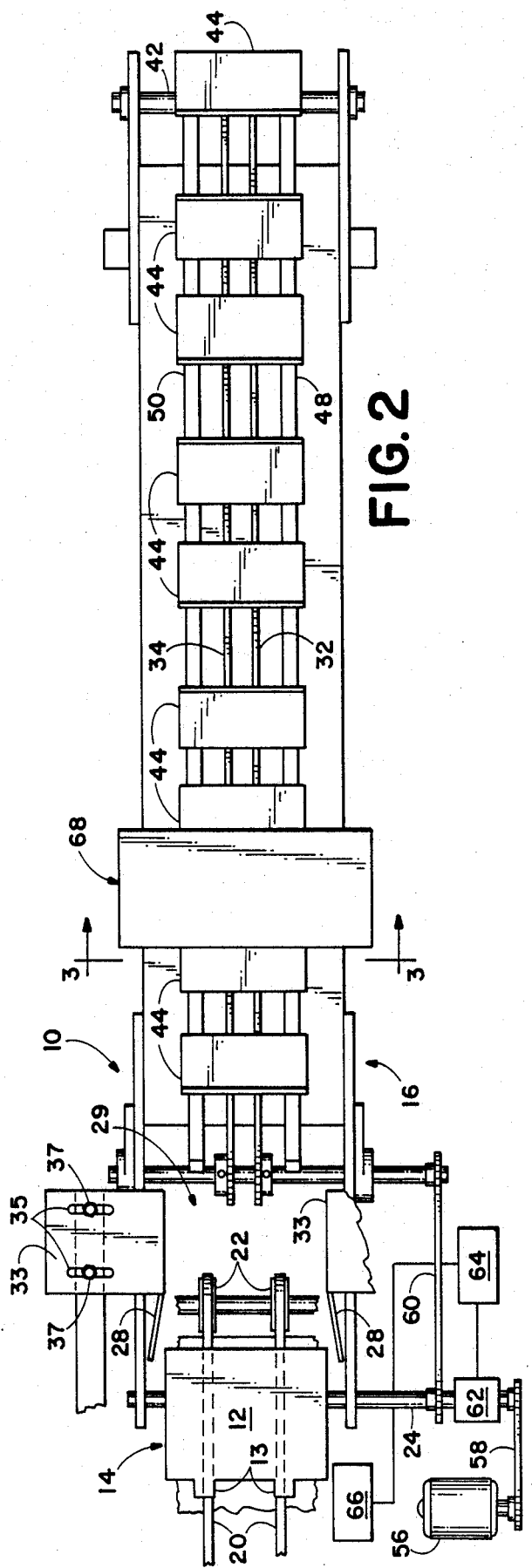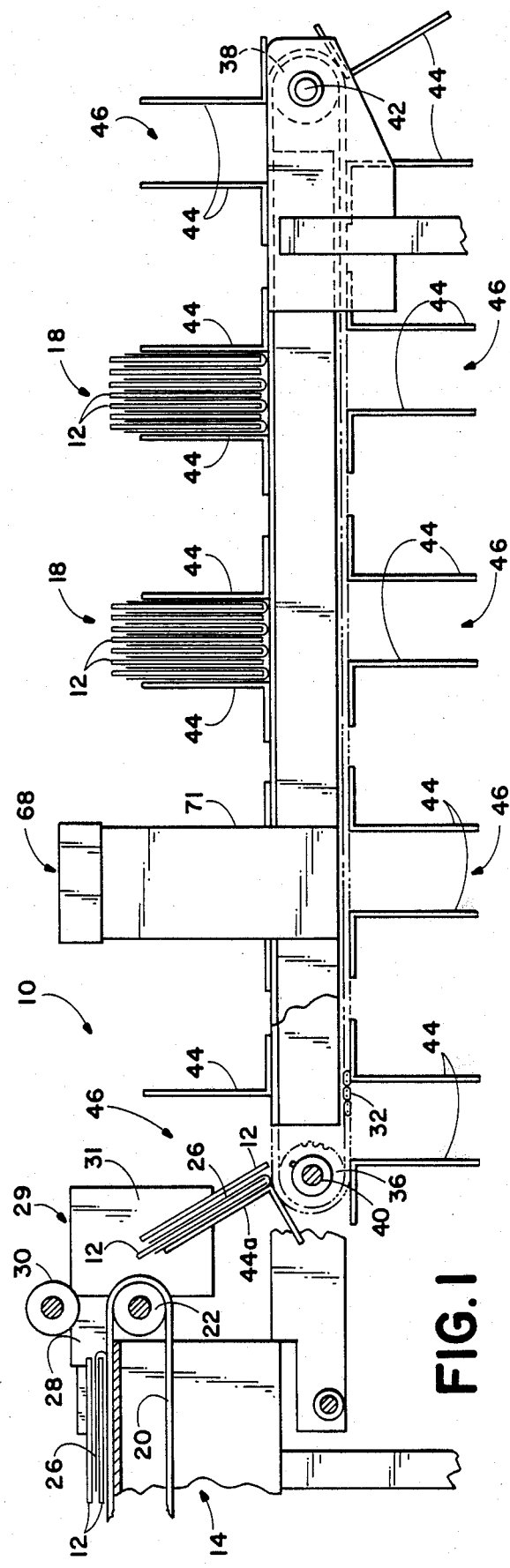

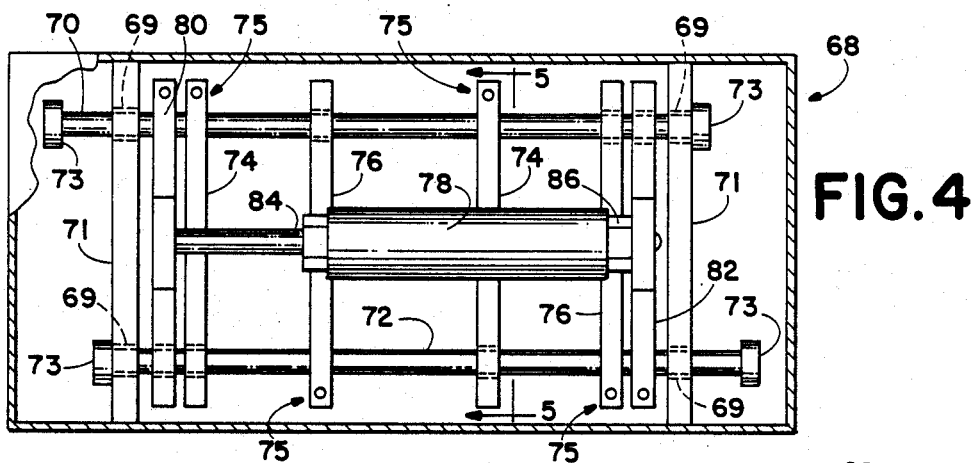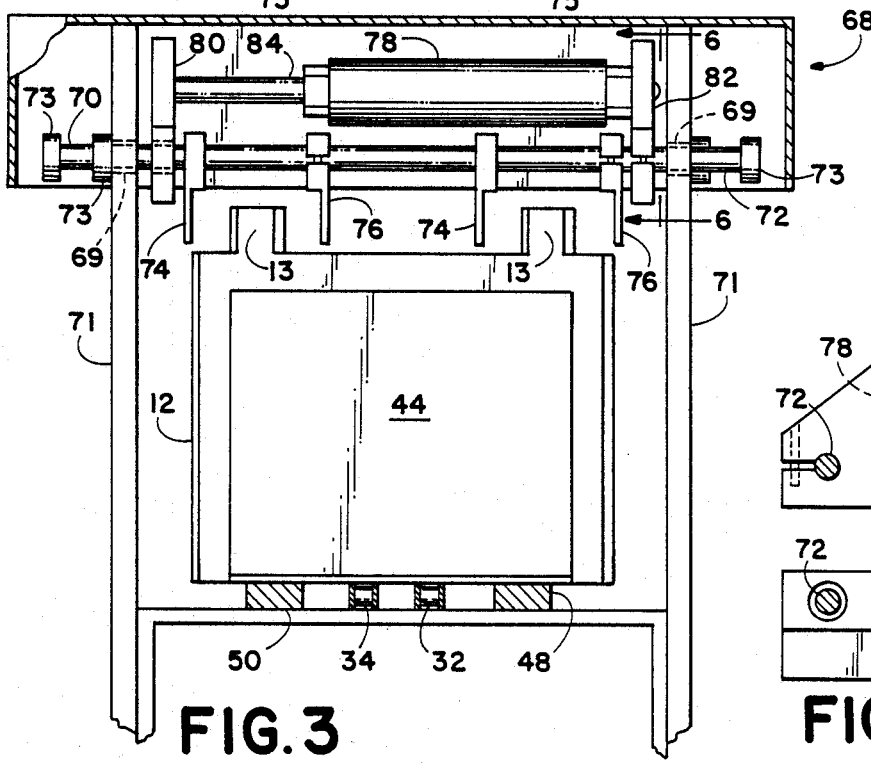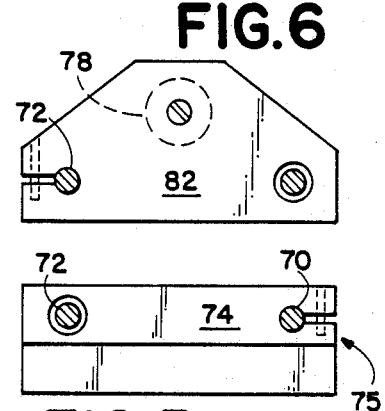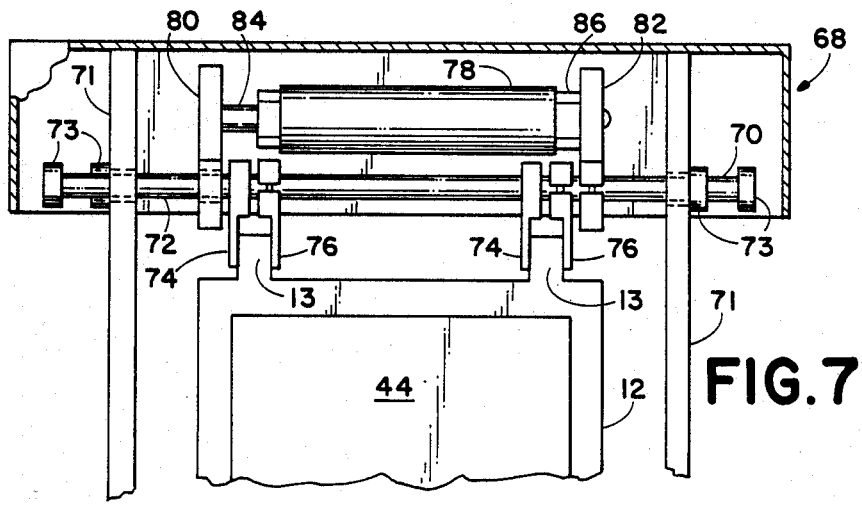

APPARATUS FOR VERTICALLY STACKING BATTERY PLATES

BACKGROUND OF THE INVENTION

The present invention is directed to a method and apparatus for receiving, supporting and transporting stacks of electrode plates for use in the manufacture of automobiles. The device is particularly suited for blocking and centering battery plate stacks preliminary to further processing of the stack before it is inserted into a battery casing.

The process of manufacturing storage batteries requires the assembly of a stack of side-by-side plates, with alternating plates in the stack being enveloped in a case of suitable porous material. The enveloped and nonenveloped plates heretofore have been manually collated, stacked, blocked and centered prior to connecting the plates in the stack together and installing the stack into the battery casing. This process is not only slow it is labor-intensive, and, therefore, adds to the cost of the battery.

Therefore, a need exists for a method and apparatus for more efficient handling of stacks of storage battery plates and for more economically blocking and centering such stacks preliminary to assembly.

SUMMARY OF THE INVENTION

The present invention eliminates the need for costly, labor-intensive handling of battery plates by arranging plates which are received serially from an enveloper or similar device in a side-by-side vertical stack until the stack contains the desired number of plates. The stack then is blocked to horizontally align the plates and it is centered to vertically align the plates.

A preferred embodiment of the stacking apparatus comprises a pair of side-by-side endless chain drives which are rotatably driven through a single revolution clutch. Extending outwardly from the chain drives are a plurality of pockets which are arranged to receive and transport a plurality of the plates in a vertical stack. The pockets each comprise two paddles one of which is attached to each of the chain drives. Each chain drive is driven by a separate sprocket and the rotational position of the sprockets relative to one another is adjustable. Thus the size of the pockets can be varied in order to accommodate stacks having differing numbers of plates.

The pockets are arranged on the chain drives in a manner such that each time the single revolution clutch makes one revolution another pocket is oriented in a loading position below the end of the enveloper conveyor. When in the loading position the downstream paddle is still on the curved end of the path of the chain drives. Thus, this paddle is not vertical but is angled back toward the enveloper conveyor and the pocket is open to facilitate insertion of the plates into it.

A microprocessor-based controller activates the clutch to start movement of the chain drives and move the next pocket into the loading position when the correct number of plates have been inserted into a pocket. The controller includes a counter which is located on the enveloper conveyor and counts the number of plates which are inserted into each pocket when it is in its loading position.

Located on each side of the chain drives is an elongate base section which acts as the bottom of the pockets and supports the battery plates. The base section forms a continuous flat surface which serves to block the stack of plates with their bottom edges aligned as they are transported through the apparatus.

Downstream of the loading position, at the position where a pocket will rest when another pocket is in the loading position, is an alignment module which engages the lugs which protrude from the tops of the plates and aligns all of the plates in the stack side to side. The alignment module includes a pair of rods which are slidably mounted horizontally along side of one another. A pair of right-hand fingers is attached to a first one of the rods and is slidably mounted on the second rod, and a pair of left-hand fingers is attached to the second rod and is slidably mounted on the first rod. The piston of an air actuated cylinder is attached to one of the rods and its base is attached to the other. Thus, when the cylinder is retracted the right-hand fingers move to the left and the left-hand fingers move to the right so as to squeeze the battery plate lugs between them and align the plates vertically.

Once the stack of plates has been centered and the pocket carrying the stack has been moved out of the alignment module, the stack can be lifted out of the pocket for further processing.

Accordingly, it is a principal object of the present invention to provide an apparatus which automatically assembles a plurality of battery plates in vertical stacks.

It is a further object of the present invention to provide such an apparatus which centers and blocks the stacks.

It is a further object of the present invention to provide such an apparatus which supports and transports the stacks in upstanding pockets.

It is a further object of the present invention to provide such an apparatus in which the width of the pockets can be adjusted to accommodate stacks having different numbers of plates.

It is a still further object of the present invention to provide such an apparatus in which the pockets can be opened at their top ends to facilitate insertion of the plates.

It is a yet further object of the present invention to provide such an apparatus in which the pockets are carried on endless chain drives.

It is a further object of the present invention to provide such an apparatus in which the chain drives are stopped when a pocket is in a loading position where plates are inserted into it.

It is a further object of the present invention to provide such an apparatus in which the chain drives are automatically moved when a predetermined number of plates are inserted into a pocket which is positioned in the loading position.

It is yet a further object of the present invention to provide a method for delivering a predetermined number of battery plates into a pocket carried on an endless chain while the movement of the chain is interrupted.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a side elevation view of an exemplary embodiment of an apparatus for stacking, blocking and centering battery plates in accordance with the present invention.

FIG. 2 is a top view of the apparatus of FIG. 1, with portions removed to expose hidden portions.

FIG. 3 is a sectional view, partially cut away to show hidden detail, taken along line 3—3 of FIG. 2.

FIG. 4 is a partially cutaway top view of the alignment module of the present invention.

FIG. 5 is a sectional view taken along line 5—5 of FIG. 4.

FIG. 6 is a sectional view taken along line 6—6 of FIG. 3.

FIG. 7 is a front view, partially cut away, of the alignment module of the present invention showing the fingers in a closed position.

DETAILED DESCRIPTION OF THE INVENTION

Referring to the drawings, wherein like numerals refer to the same elements, and in particular to FIGS. 1 and 2, a preferred embodiment of the present invention is shown as comprising an apparatus 10 for the handling of plates 12 having dual lugs 13 projecting from their upper edge, which are used in storage batteries. A transport unit 14 of an enveloping apparatus serially delivers the plates 12 to the apparatus and a drive unit 16 receives a plurality of the plates and accumulates them as vertical stacks. It then blocks and centers the stacks as well as transports them through the apparatus. The transport unit 14 includes a pair of belts 20 which are rotatively mounted on sheaves 22 that are driven to rotate in unison. Plates 12 which are encapsulated in envelopes 26 are transported horizontally on the belts 20 with their lugs 13 positioned rearwardly of the direction of travel, with each lug 13 positioned substantially over a respective belt. A non-enveloped plate is placed on top of each enveloped plate before it reaches the end of the transport unit so that the plates are delivered in pairs. As the pairs of plates reach the end of the transport unit 14 their side edges are substantially aligned by sliding engagement with the tapered path formed by the cooperatively inclined panels 28 of a centering chute 29. As each pair of plates reaches the end of the transport unit 14, the pair is held in horizontal engagement with the unit 14 by one or more freely rotatable spindles 30, the perimeter of which contacts the upper plate until substantially the entire lower plate is disengaged from the belts 20.

The endless drive unit 16 of the subject invention is positioned forward and below the end of the transport unit 14 so that it receives the plate pair as it is released from the transport unit. As the plates are lowered, the sides 31 of the centering chute 29 keep them generally aligned. The tops 33 of the centering chute elements have slots 35 which permit them to be adjustably attached to the frame of the apparatus by means of bolts 37. Thus, the width of the centering chute can be adjusted to accommodate different size plates.

The drive unit preferably includes a pair of endless chain drives 32, 34 which are matingly engaged at one end by sprockets 36, and are engaged at the opposite end by sprockets 38. The sprockets 36 are mounted on a shaft 40 with one of them being attached to the shaft and the other rotating freely on it. Both of the sprockets 38 are attached to a shaft 42. L-shaped paddles 44 are connected to the chain drives 32, 34. The paddles 44 are configured as opposing pairs in a perpendicular bookend-like configuration so as to form a pocket 46 between them for receiving a stack of the plates 12, with one of the paddles in each pair being attached to the chain drive 32 and the other paddle being attached to the chain drive 34. At least one of the sprockets 38 is adjustably clamped to shaft 42 so as to provide for alteration of the phase relationship between the chain drives 32, 34 in order to vary the width of the pockets 46 to accommodate the desired number of plates 12 in a stack 18. The drive unit 16 also includes a pair of stationary base segments 48, 50, the upper surfaces of which define a single substantially horizontal plane which is above the tops of the chain drives.

In operation, the rotation of the chain drives 32, 34 is interrupted when the paddles are in a plate-receiving position where one of the paddles 44 has not rounded the sprocket 36 at the receiving end of the drive unit 16. In this position the pocket 46 is open with the rear or upstream paddle 44a inclined to receive the plates from the transport unit 14. When the chain drives commence rotation again the upstream paddle 44a moves to a fully upright position thereby closing the pocket and supporting the plates in a vertical stack 18. The transport of the stack 18 across the substantially planar stationary base segments 48, 50 allows gravitational forces to settle the base of each plate onto the plane of the base segments thereby blocking the stack.

The motor 56 which is used to operate the enveloping apparatus transport unit 14 also is used to operate the drive unit 16. The motor 56 acts through a belt 58 to drive a single revolution clutch 62 which in turn drives the shaft 40 of the drive unit through a chain 60. The clutch is responsive to an electrical signal from a microprocessor-based controller 64 to initiate movement of the chain drives to position an empty pocket 46 in the plate-receiving position when a predetermined number of plates have been deposited in the preceding pocket. The controller 64 includes counter 66 which is connected to the transport unit 14 to detect the number of plates which have been received. When the correct number of plates have been inserted into the pocket, the controller 64 releases the clutch 62 so that it can rotate one revolution and move the chain drives to position the next pocket in the receiving position.

An alignment module 68 is positioned above the drive unit 16 so as to receive a stack 18 to be centered while the chain drives are interrupted to load an open pocket. The alignment module 68, best seen in FIGS. 3, 4 and 7, includes a pair of oppositely reciprocating slide rods 70, 72 which carry a set of left-hand fingers 74 and a set of right-hand fingers 76 which cooperate to engage the lugs 13 of the plates 12 in the stack 18. Each left-hand finger 74 is fixedly attached at one of its ends to the slide rod 70 and is slidably mounted at its opposite end on the rod 72 as shown in FIGS. 4 and 5. Each right-hand finger 76 is slidably attached at one of its ends to the slide rod 72 and is slidably mounted at its opposite end on the rod 70. The fingers 74, 76 are secured to their respective guide rods by clamps 75 which permit them to be positioned at any desired location along the guide rods. The slide rods 70, 72 are slidably carried in openings 69 located in a pair of end frames 71 which are separated from each other by a distance which is less than the length of the slide rods. The slide rods have stops 73 located on each of their ends which are larger than the openings 69. Thus, the slide rods can move back and forth in the end frames over a limited range of travel.

The alignment module 68 also includes an air cylinder 78 which is secured to the slide rods 70, 72. The piston 84 of the cylinder is secured to a piston bracket 80 and the base 86 of the cylinder is secured to a base bracket 82. The base bracket 82, as seen in FIGS. 4 and 6, is attached proximate one of its ends to the slide rod 72 and is slidably mounted proximate its opposite end on rod 70. The piston bracket 80 is attached proximate one of its ends to the slide rod 70 and is slidably mounted proximate its opposite end to rod 72. With the piston rod 84 fully extended, the alignment module is in a fully open position to receive an unaligned stack of plates 18 as seen in FIG. 3. The alignment module is located on the drive unit in a manner such that each time the chain drives stop rotating the stack 18 is correctly positioned within the module 68. When this occurs, the controller activates the piston cylinder so as to retract the piston 84. As best seen in FIG. 4, such retraction results first in a rightward movement of the piston 84, piston bracket 80, slide rod 70 and left-hand fingers 74. However, once the stop 73 on the left end of the slide rod 70 contacts the left-hand end frame 71, the other slide rod 72 and the right-hand fingers 76 are moved toward the left. The two finger pairs 74, 76 thus move in opposition so as to engage opposite walls of the lugs 13 of the stack of plates 18 as seen in FIG. 7. The opposing fingers engage the lugs 13 with sufficient force so that the plates 12 are centered into vertical alignment. The piston then is extended again to remove the fingers from the lugs. The controller may be programmed to repeat this operation several times, if necessary, to fully center the plates. Since the fingers are attached to the guide rods by means of clamps 75, they can be positioned to accommodate lugs having different sizes and spacings. Because centering occurs much more quickly than a pocket can be loaded with plates, the fingers will be removed from the lugs when the clutch 62 is activated again by the controller to move the chain drives.

The centered and blocked stacks are removed by manual or automated means from their pockets prior to reaching the end of the chain drives.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An apparatus for handling battery plates comprising:
    (a) a pair of side-by-side endless drive loops each having a plurality of upwardly extending paddles connected thereto;
    (b) said paddles arranged in sets with an upwardly opening pocket being created between each set for receiving, supporting and transporting a plurality of battery plates in a vertical stack, and one paddle in each set being attached to each of said drive loops;
    (c) means for moving said drive loops in synchronization with one another so that the distance between the paddles in each set remains constant as said drive loops are moved;
    (d) adjustment means for altering the phase relationship between said drive loops so as to change the distance between the paddles in each set;
    (e) means for interrupting the movement of said drive loops when one of said pockets is in a loading position where it receives the plates which constitute said stack;
    (f) means for opening said one of said pockets when it is in said loading position to facilitate the insertion of plates therein;
    (g) counter means for determining the number of plates received by said one of said pockets when it is in said loading position;
    (h) wherein said means for interrupting includes drive loop sequencing means which is responsive to said counter means for interrupting movement of said drive loops until a predetermined number of said plates have been received in said one of said pockets;
    (i) means for blocking the plates in each of said pockets so that said plates are in horizontal alignment with one another; and
    (j) means for centering the plates in each of said pockets so that said plates are in vertical alignment with one another.

2. The apparatus of claim 1 wherein said sequencing means includes a microprocessor-based controller and said means for interrupting further includes clutch means which permits said endless drive loops to move a predetermined distance when said clutch receives an electrical signal from said controller.

3. The apparatus of claim 1 wherein said means for centering comprises a pair of reciprocating slide rods having cooperatively opposed sets of fingers attached thereto.

4. The apparatus of claim 3 wherein said means for centering further includes a piston cylinder having a base which is secured to one of said pair of slide rods and a piston which is attached to the other.

5. The apparatus of claim 3 wherein one of said sets of fingers is fixedly attached to a first one of said slide rods and is slidably mounted on a second one of said slide rods and the other of said sets of fingers is fixedly attached to said second one of said slide rods and is slidably mounted on said first one of said slide rods.

6. The apparatus of claim 1 wherein said means for blocking includes a substantially planar stationary base segment over which the bottom edges of said plates of said stack are slidably transported.

* * * * *